(12) United States Patent
Narita

(10) Patent No.: US 12,056,408 B2
(45) Date of Patent: Aug. 6, 2024

(54) NON-TRANSITORY COMPUTER-READABLE RECORDING MEDIUM HAVING SUPPORTING PROGRAM TO DETERMINE SIZE CONFORMITY OF SHEET SIZE AND IMAGE SIZE

(71) Applicant: BROTHER KOGYO KABUSHIKI KAISHA, Nagoya (JP)

(72) Inventor: Kenju Narita, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/337,662

(22) Filed: Jun. 20, 2023

(65) Prior Publication Data

US 2023/0333790 A1   Oct. 19, 2023

Related U.S. Application Data

(63) Continuation of application No. PCT/JP2021/045980, filed on Dec. 14, 2021.

(30) Foreign Application Priority Data

Dec. 24, 2020 (JP) .................. 2020-214615

(51) Int. Cl.
G06F 3/12 (2006.01)
B41J 29/38 (2006.01)
(Continued)

(52) U.S. Cl.
CPC .......... G06F 3/1255 (2013.01); B41J 29/38 (2013.01); G06F 3/1208 (2013.01);
(Continued)

(58) Field of Classification Search
None
See application file for complete search history.

(56) References Cited

U.S. PATENT DOCUMENTS

| 2015/0071672 A1* | 3/2015 | Kubota | G03G 15/5016 399/81 |
| 2020/0280654 A1* | 9/2020 | Achiwa | H04N 1/409 |
| 2020/0310717 A1 | 10/2020 | Yamada | |

FOREIGN PATENT DOCUMENTS

| JP | 2001229005 A | 8/2001 |
| JP | 2007055114 A | 3/2007 |

(Continued)

OTHER PUBLICATIONS

International Search Report dated Mar. 15, 2022 issued in PCT/JP2021/045980.

(Continued)

*Primary Examiner* — Lennin R Rodriguezgonzalez
(74) *Attorney, Agent, or Firm* — Scully, Scott, Murphy & Presser, P.C.

(57) ABSTRACT

In response to a print instruction instructing a printer to print an image being made with respect to a general-use printing program implemented in an operating system of the information processing device, the information processing device uses a supporting program to obtain an image size of print data subject to printing based on the number of vertical dots, the number of horizontal dots, and print resolution of the print data. Further, the information processing device obtains second size information indicating a sheet size included in a print setting and determines, by comparing the image size the sheet size, whether the sheet size conforms to the image size. When determining that the sheet size does not conform to the image size, the information processing device performs a warning process of displaying a warning message using a user interface.

9 Claims, 4 Drawing Sheets

(51) Int. Cl.
G06K 15/00 (2006.01)
G06K 15/02 (2006.01)
(52) U.S. Cl.
CPC ....... *G06F 3/1259* (2013.01); *G06K 15/1882* (2013.01); *G06K 15/4065* (2013.01)

(56) References Cited

FOREIGN PATENT DOCUMENTS

| JP | 2007145540 A | 6/2007 |
| JP | 2015009483 A | 1/2015 |
| JP | 2020166350 A | 10/2020 |

OTHER PUBLICATIONS

International Preliminary Report on Patentability and Written Opinion dated Jun. 13, 2023 issued in PCT/JP2021/045980 together with English language translation.

* cited by examiner

NON-TRANSITORY COMPUTER-READABLE RECORDING MEDIUM HAVING SUPPORTING PROGRAM TO DETERMINE SIZE CONFORMITY OF SHEET SIZE AND IMAGE SIZE

REFERENCE TO RELATED APPLICATIONS

This application is a Continuation Applications of International Application No. PCT/JP2021/045980 filed on Dec. 14, 2021, which claims priority from Japanese Patent Application No. 2020-214615 filed on Dec. 24, 2020. The entire disclosures of the priority application are incorporated herein by reference.

BACKGROUND ART

The present disclosures relate to a non-transitory computer-readable recording medium containing computer-executable instructions realizing a supporting program which is used to support controlling of a printer connected to a computer.

DESCRIPTION

There has been conventionally known technology of detecting a size mismatch by comparing a size of an image represented by received print data with a size of a printing sheet set to a printer.

In recent years, technology has been put to practical use in information processing devices to control printers by a printing program that is built into an operating system (OS) as a standard feature, instead of using a conventionally-known printer driver. According to the above-mentioned conventional technology, the OS associates a printer with an OS-standard print program, and thereafter, it becomes possible that, when a print instruction directed to the printer is received, the printer can perform printing using the OS-standard print program without using a printer driver.

If the information processing devices are configured to detect size mismatches between the size of an image to be printed and the size of a printing sheet, the processing load on the printer will be reduced. However, when using the OS-standard general-use printing program as described above, the user may notice unintended print results (e.g., a printed image not fitting on the printing sheet) due to a mismatch of an image size and a sheet size, after printing.

According to aspects of the present disclosures, there is provided a non-transitory computer-readable recording medium for an information processing device which includes a memory and a computer, a printer being connected to the information processing device. The non-transitory computer-readable recording medium containing computer-executable instructions realizing a supporting program corresponding to the printer connected to the information processing device. In response to a print instruction, which is output from an application program implemented in the information processing device, instructing the printer to print an image being made with respect to a general-use printing program implemented in an operating system of the information processing device, the instructions causes, when executed by the computer, the information processing device to perform a first obtaining process of obtaining first size information indicating an image size of a raster image indicating an image subject to printing according to the print instruction, based on a number of vertical dots, a number of horizontal dots, and print resolution of the raster image, a second obtaining process of obtaining second size information indicating a sheet size included in a print setting of the print instruction, a determining process of determining, by comparing the image size indicated by the first size information obtained in the first obtaining process and the sheet size indicated by the second size information obtained in the second obtaining process, whether the sheet size conforms to the image size, and a warning process of warning using a user interface of the information processing device when determining that the sheet size does not conform to the image size.

Hereinafter, a personal computer (hereinafter referred to as "PC") using a supporting program will be described in detail with reference to the accompanying drawings. This specification discloses the supporting program to be executed on the PC which is connected to a printer having a printing function.

Figure 1:
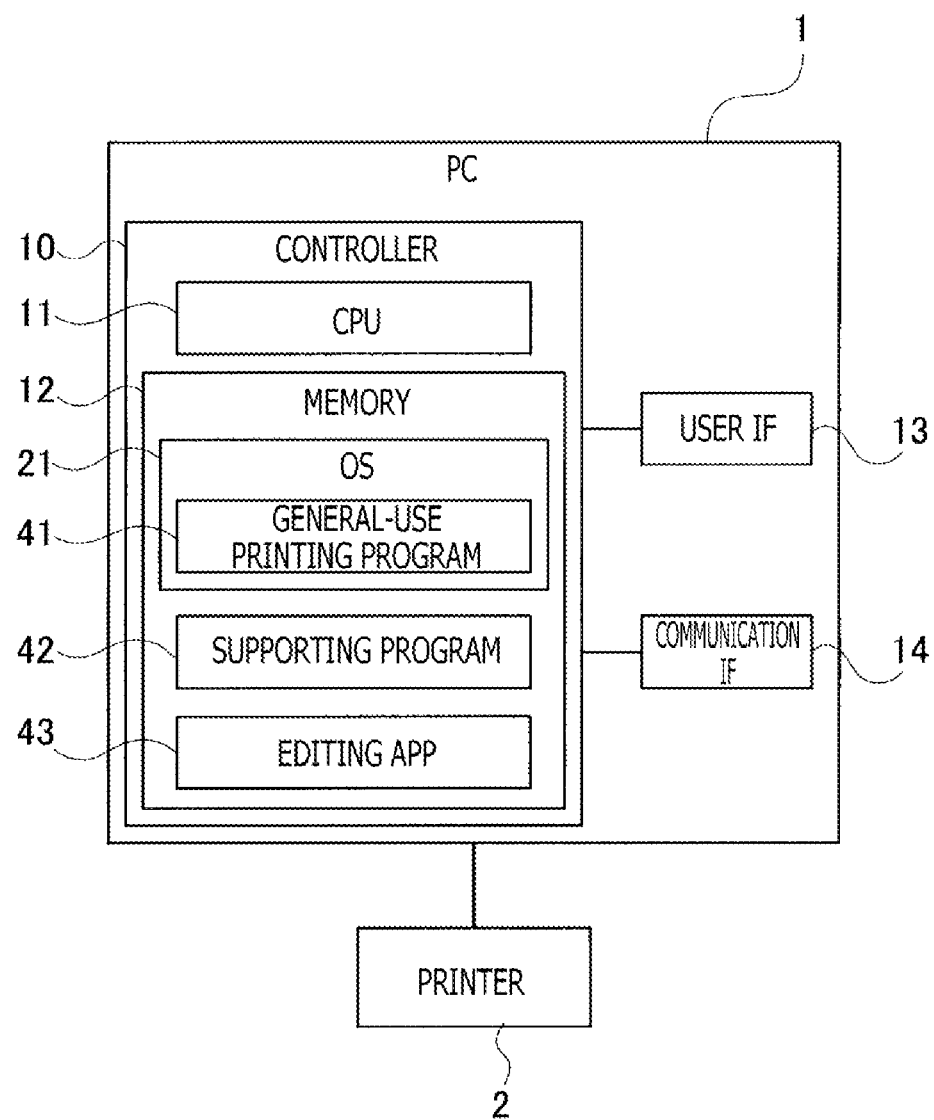
FIG. 1 is a block diagram showing an electrical configuration of a PC.

As shown in FIG. 1, the PC 1 has a controller 10 that includes a CPU 11 and a memory 12. The PC 1 is an example of an information processing device, and the CPU 11 is an example of a computer. The PC 1 is further provided with a user IF (interface) 13 and a communication IF 14, which are electrically connected to a controller 10. It is noted that the term "controller" in FIG. 1 is a collective name including hardware and software used for controlling the PC 1, and does not necessarily mean a single piece of hardware existing in the PC 1.

The CPU 11 performs various processes in response to user's operation and in accordance with programs retrieved from the memory 12. The memory 12 stores various programs including various application programs (hereinafter, referred to as apps), and various data. The memory 12 is also used as a work area when various processes are performed. A buffer provided to the CPU 11 is also an example of a memory. It is noted that not only a ROM, a RAM, an HDD and the like built in the PC 1, but also storage media to/from which the CPU 11 write/read data, e.g., recording medium such as a CD-ROM, a DVD-ROM and the like, are examples of the memory 12.

The user IF 13 includes hardware configured to display a screen to inform the user of information and hardware configured to receive operations by the user. The user IF 13 may be a pair of a display capable of displaying information and a mouse, a keyboard, and the like with an input reception function, or a touch panel with a display function and an input reception function.

The communication IF 14 includes hardware for communicating with external devices such as the printer 2. The communication standards for communication IF 14 include Ethernet (registered trademark of Fuji Xerox Co., Ltd.), Wi-Fi (registered trademark of Wi-Fi Alliance), and USB. The PC 1 may be equipped with multiple communication IFs 14 that support multiple communication standards, respectively.

The memory 12 of the PC 1 contains an operating system (hereinafter, referred to as an "OS") 21, including a general-use printing program 41, an supporting program 42, and an editing app 43, as shown in FIG. 1. The supporting program 42 is an example of a supporting program. The editing app 32 is an example of an application program. The OS 21 is, for example, Windows (registered trademark of Microsoft Corporation), macOS (registered trademark of Apple Inc.), Linux (registered trademark of Linus Torvalds), iOS (registered trademark of Cisco), or Android (registered trademark of GOOGLE LLC.).

The general-use printing program 41 is an OS-standard program for having various printers, such as the printer 2, perform printing based on user instructions. The general-use printing program 41 is a program that includes a function of generating intermediate image data based on the image data subject to printing.

The general-use printing program 41 supports functions that can be commonly used by multiple models of printers offered by various printer vendors. The general-use printing program 41 does not support all of the functions inherent in the various printers, but supports only generic functions.

The supporting program 42 is a program or a group of programs that accompanies the processing of the general-use printing program 41 and executes processing based on instructions from the OS 21, and is an app that supports control of target hardware. The supporting program 42 corresponds to the model of the printer 2 connected to the PC 1. When an instruction to cause the printer 2 to perform printing is received using the general-use printing program 41, the printer 2 is started by the general-use printing program 41. The supporting program 42 is called, for example, Hardware Support App (HSA).

The supporting program 42 is configured to receive multiple kinds of commands from the general-use printing program 41, and executes respective processes based on the received commands. The supporting program 42 may be a combination of multiple programs, each of which receives execution instructions, or a single program which can perform different processes depending on instructions.

The supporting program 42 may be a program prepared by a printer vendor for each type of printer. For example, a supporting program for inkjet printers and a supporting program for laser printers may be prepared for each type of printer. When a new printer is connected to the PC1, for example, the OS 21 of the PC 1 downloads an appropriate supporting program from a server or other source and incorporates the same into its own device (i.e., the PC 1), depending on the type of printer connected. The OS 21 then stores the identification information of the incorporated supporting program in the memory 12 by associating the same with the printer information of the newly connected printer. It should be noted that there may be supporting programs prepared not only for each printer type, but also for each printer model or series of printer models.

The editing app 43 is, for example, an application for generating or editing image data and/or document data. The editing app 43 may be, for example, Word or PowerPoint of Microsoft Corporation, or an app provided by the vendor of the printer 2. The editing app 43 receives user operations, including instructions to cause the printer 2 to perform a particular operation. Concretely, the editing app 43 receives, for example, a print execution instruction, via the user IF 13, to cause the printer 2 to perform printing.

The printer 2 is a device having a printing function. The PC 1 is configured to communicate with the printer 2 via the communication IF 14. The printer 2 receives print data, for example, from the PC1 or other devices and performs printing based on the received print data. When the printer 2 receives a command requesting a capability value from the PC 1 or other devices, the printer 2 reads the capability value information indicating the capability of its own device and transmits the capability value information back to the device that has transmitted the command. The capability value information transmitted by the printer 2 includes, for example, information on the trays installed, information on the sheet setting for each tray, and information on the print resolution supported.

Figure 2:
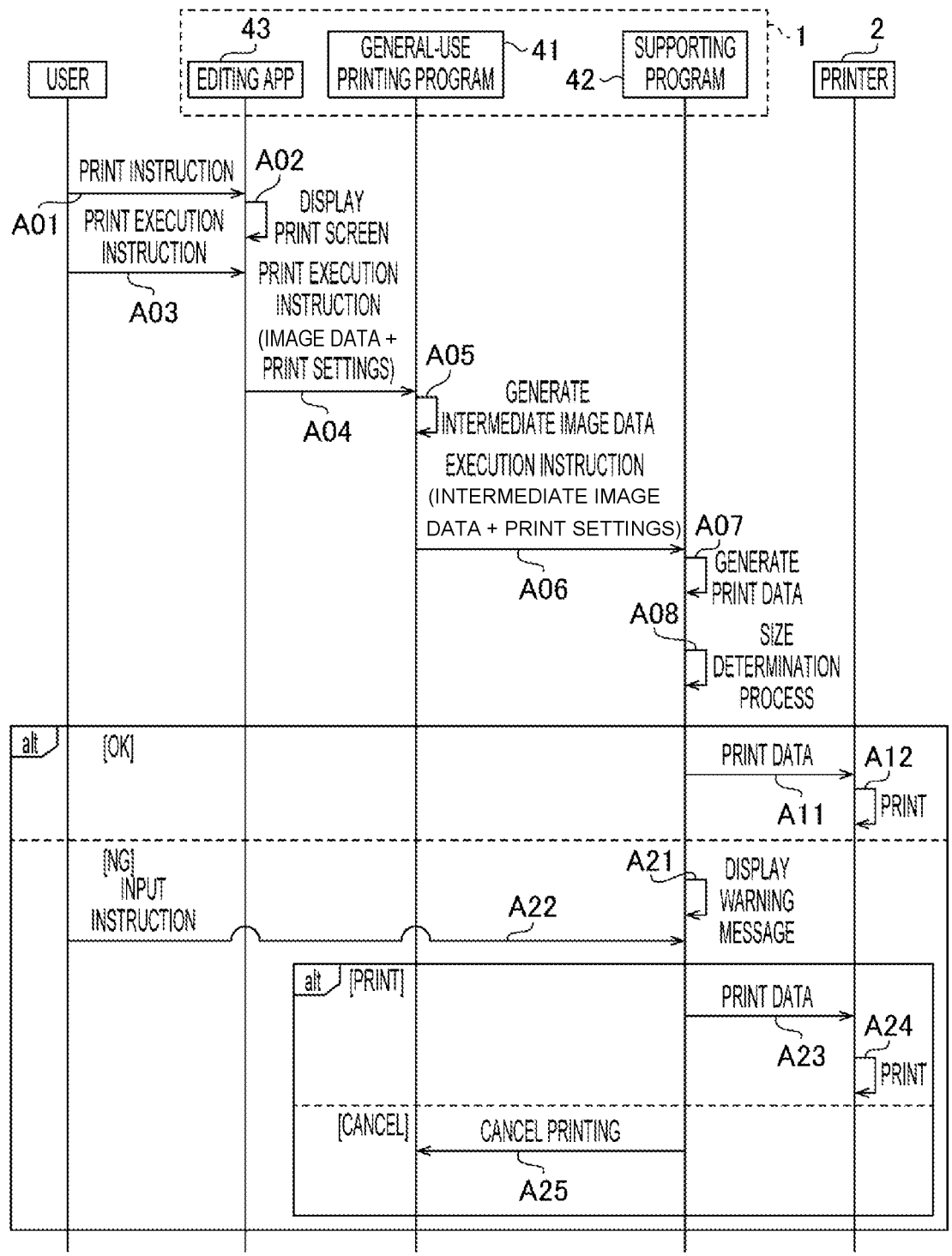
FIG. 2 is a sequence chart illustrating procedures for a printing operation performed by programs.

Next, the printing procedure, including the operation of the supporting program 42, is described with reference to the sequence chart shown in FIG. 2. FIG. 2 shows a case in which an application configured to receive printing instructions, such as the editing app 43, receives a printing instruction to cause the printer 2 to perform printing using the general-use printing program 41, and a case in which the supporting program 42 corresponding to the printer 2 has been built into the PC 1.

The processes and each processing step in the flowchart basically indicate the processing of the CPU 11 according to the instructions described in the program, such as the supporting program 42. The process by the CPU11 includes hardware control using the API of the OS21. In this specification, detailed descriptions of the OS 21 are omitted to describe the operation of each program. Further, a term "obtain" is used in a concept that does not require a request.

The editing app 43 receives generating or editing of text, charts, and the like based on the user's instructions. When the editing app 43 receives instructions for printing a currently selected text, or the like (A01), the editing app 43 displays a print screen for receiving print settings, and the like, on the user IF 13 (A02). The editing app 43 receives, for example, a print execution instruction, an instruction for basic print settings, and an instruction to start receiving detailed print settings on the print screen.

When the editing app 43 receives a print execution instruction from the user with the printer 2 selected on the currently displayed print screen (A03), the editing app 43 passes the information of the received print execution instruction to the OS 21. When the OS 21 receives a print execution instruction to use the general-purpose print program 41, the OS 21 executes the general-purpose print program 41 and passes the information of the print instruction to the general-use printing program 41 (A04). The general-use printing program 41 can obtain, for example, information indicating the printer to be used for printing, information indicating the print settings set by the app, and information indicating the image data to be printed, as information on the print instructions.

The general-use printing program 41 generates intermediate image data by converting an image data format contained in the received print instruction information into an intermediate image data format (A05), and generates a print job including the intermediate image data. The image data passed from the editing app 43 can be of various types, and the general-use printing program 41 converts the received image data into intermediate image data suitable for generating print data. If the image data included in the print instruction is suitable for generating the print data, the generation of intermediate image data may be omitted and the intermediate image data may be used as-is. The intermediate image data generated by the general-use printing program 41 is, for example, XPS data.

The general-use printing program 41 outputs an execution instruction to the supporting program 42, since the device selected in the printing instruction is the printer 2 and the supporting program 42 corresponding to the printer 2 is stored in the memory 12 (A06). The general-use printing program 41 causes the supporting program 42 to run and passes the generated intermediate image data to the supporting program 42 by means of execution instructions. In A06, information on print settings is also passed to the supporting program 42 along with the intermediate image data. The print setting information passed to the supporting program at A06 includes, for example, sheet size information and sheet type information. The general-use printing program 41 may execute the supporting program 42 before generating the intermediate image data and passing the print setting information to the supporting program 42.

The supporting program 42 performs rasterization based on the intermediate image data in accordance with the execution instruction received from the general-use printing program 41 at A06, and generates the print data indicating the image subject to printing (A07). A07 is an example of a generation process. The print data generated in A07 is data in a format that can be used for printing by the printer 2. The data is, for example, PDL data dedicated to the model of the printer 2. The print data is an example of a raster image.

By rasterizing with the supporting program 42 corresponding to the printer 2, there is a greater degree of freedom than in the case where rasterizing with the general-use printing program 41, and the print data suitable for printing with the printer 2 is likely to be generated. The print data generated in A07 may be data in a format that can be used for printing on printers other than the model of the printer 2.

The supporting program 42 executes a size determining process (A08) based on the print data generated at A07 and the sheet size information contained in the print settings received at A06. The size determining process is a process to determine the suitability of the sheet size by comparing the size of the image to be printed, which is the result of printing when printing based on print data is performed, with the sheet size included in the print settings.

Instead of the supporting program 42 generating the print data at A07, the general-use printing program 41 may generate the print data. In other words, the general-use printing program 41 may rasterize the intermediate image data generated in A05 to generate the print data and pass the generated print data to the supporting program 42. In such a case, the supporting program 42 executes the size determining process based on the print data received from the general-use printing program 41.

The print data generated by the general-use printing program 41 is print data in a format that can be used for printing on various printers, such as PWG Raster data or PDF data. If rasterization is performed by the general-use printing program 41, the supporting program 42 requires less processing, thus avoiding an increase in processing time and reducing the program size of the supporting program 42. When the size is determined based on the print data generated by the general-use printing program 41, the general-use printing program 41 does not have to pass the intermediate image data to the supporting program 42.

Next, the procedure of a size determining process executed at A08 in FIG. 2 will be described with reference to a flowchart shown in FIG. 3. This size determining process is a process of the supporting program 42 and is executed by the CPU 11 of the PC 1.

In the size determining process, the CPU 11 obtains the sheet information included in the print settings based on the print settings received from the general-use printing program 41 at A06 in FIG. 2 (S101). The sheet information includes, for example, the sheet size, the sheet type, and other information. The sheet size information included in the sheet information obtained in S101 is an example of second size information. S101 is an example of a second obtaining process.

The CPU 11 then determines whether the sheet information of the obtained print settings is subject to determination (S102). If the sheet indicated by the print settings is, for example, a plain paper or a recycled paper, and the sheet size is a standard size such as A4, the user's loss is likely to be small even if sheets are wasted due to printing that does not conform to the size. If the sheets are assumed to be inexpensive sheets, it is preferable to complete printing early and output the printed results, since image overflow and printing redo are relatively tolerated.

If the CPU 11 determines that the current printing is not subject to execution of the determination (S102: NO), the CPU 11 determines "OK" (S111) and terminates the size determining process. If the sheet type is plain paper or recycled paper and the sheet size is a fixed size such as A4, B5, or the like, the CPU 11 determines "NO" at S102. If the printing is not subject to determination, the print result can be output at an early stage by determining "OK" without performing processes from S103 onward.

On the other hand, if the sheet that is likely to be high priced is specified as the print settings, it is undesirable to waste the sheets by printing on the sheets that do not conform to the sheet size of the print setting. For example, if the sheet type is cardboard, postcard, sticker paper, OHP paper, or cloth, or if the sheet size is postcard or envelope, the sheet is likely to be more expensive than a standard-size sheet of plain or recycled paper. The sheet size indicating a postcard or envelope is an example of a particular size of a high value. Further, sheet types indicating cardboard, postcard, sticker paper, OHP paper, and cloth are examples of a particular type of a high value. The CPU 11 determines YES at S102 when the sheet type is neither plain paper nor recycled paper, or when the sheet size is neither A4, A5, B4, nor B5.

When the CPU 11 determines that the paper information is subject to the determination (S102: YES), the CPU 11 calculates the image size of the image to be printed, which is the print result when printing based on the print data generated in A07 in FIG. 2 (S103). Concretely, the CPU 11 calculates the horizontal and vertical sizes of the image to be printed by dividing the number of dots per line and lines of the print data by the print resolution (e.g., expressed in dots per inch) specified in the print settings, respectively. The information on the size of the image to be printed which is calculated in S103 is an example of first size information. S103 is an example of a first obtaining process.

Then, the CPU 11 compares the sheet size included in the sheet information obtained at S101 with the image size of the image to be printed which is calculated at S103, and determines whether the image size of the image to be printed is larger than the sheet size (S106). S106 is an example of a determining process. When, for example, a fixed size such as A4 is specified as the sheet size for printing, the CPU 11 compares the horizontal and vertical sizes of the sheet size with the horizontal and vertical sizes of the image to be printed which is calculated in S102, respectively. The CPU 11 may compare the size of the printable range of the sheet with the image size of the image to be printed based on the margin settings.

If the CPU 11 determines that the image size of the image to be printed is not larger (S106: NO), the CPU 11 determines whether the difference between the image size and the sheet size is larger than a particular range (S107). S107 is an example of a determining process. If the CPU 11 determines that the difference between the image size and the sheet size is within the particular range for both the vertical and horizontal sizes (S107: NO), the CPU 11 determines "OK"

(S111) and terminates the size determining process. When the image size is less than or equal to the paper size and the size difference is small, the image will fit on the sheet, thus the entire image can be printed on the sheet, and the margins are likely to be adequate without being too large. In such a case, the CPU 11 determines that the sheet size is appropriate.

On the other hand, if the CPU 11 determines that the image size of the image to be printed is larger (S106: YES), or if the image size is smaller than the sheet size but difference between the image size and the sheet size is larger than the particular range (S107: YES), the CPU 11 determines "NG" (S112) and the size determining process is terminated. If the image size of the image to be printed is larger than the sheet size, the image will not fit on the sheet, and printing will likely result in the image sticking out of the sheet, which is not the user's intention. Further, even if the image size is smaller than the sheet size, but the difference is larger than the particular range, the margins are likely to be too large, resulting in more paper waste. In these cases, the CPU 11 determines that the sheet size is not suitable, that is "NG."

If the image size is larger than the sheet size but the difference is slight, the affect is likely to be small even if there are partial prints that are not printed. Alternatively, the entire image could be printed by, for example, reducing the margins. Therefore, even though the image size is larger than the sheet size, if the size difference is small for both the vertical and horizontal sizes, the CPU 11 may determine that the image size is "OK."

If the sheet type included in the print settings indicates a roll sheet, the supporting program 42 does not have to compare the vertical size (length in the unwinding direction of the roll sheet, also referred to as sheet length) among the sheet sizes. In such a case, the supporting program 42 should only compare the horizontal size (an axial length of the roll sheet, also referred to as a sheet width) at S106 or S107.

The number of vertical and horizontal dots in the print data is determined based on the size of the image data specified by the editing app 43, regardless of the print settings. The supporting program 42 will likely not be able to obtain information from the editing app 43, but when it can, the supporting program 42 may obtain the image size based on information obtained from the editing app 43. Further, when the supporting program 42 can obtain the image size from the intermediate image data without generating print data, the supporting program 42 may obtain the image size based on the intermediate image data. In the above cases, the supporting program 42 may obtain the image size before A07 in FIG. 2, and perform the determinations in S106 and S107 using the obtained image size instead of S103 in the size determining process, and generate print data when it is determined that the image size is "OK."

However, the process of obtaining information from the editing app 43 and the process of obtaining the image size from the intermediate image data may take some time. Further, if the determination is made based on the actually generated print data, it is more likely to be accurate. For this reason, it is preferable to perform the size determining process after the print data has been generated.

Returning to the explanation in FIG. 2, if the supporting program 42 determines "OK" in the size determining process in A08 (alt: [OK]), the supporting program 42 transmits the print data generated in A07 and the command to execute the print operation to the printer 2. The printer 2 that receives the print data and the command to execute printing prints the image of the print data based on the received command (A12). In this way, a printed material is generated. The supporting program 42 further notifies the general-use printing program 41 that the transmission of print data has been completed.

It is noted that the transmission of the print data to the printer 2 may be performed by the general-use printing program 41. That is, the supporting program 42 may pass the generated print data to the general-use printing program 41 in such a manner that the print data will be transmitted from the PC 1 to the printer 2 as the destination. In such a case, the general-use printing program 41 transmits the print data received from the supporting program 42 to the printer 2.

Figure 4A:
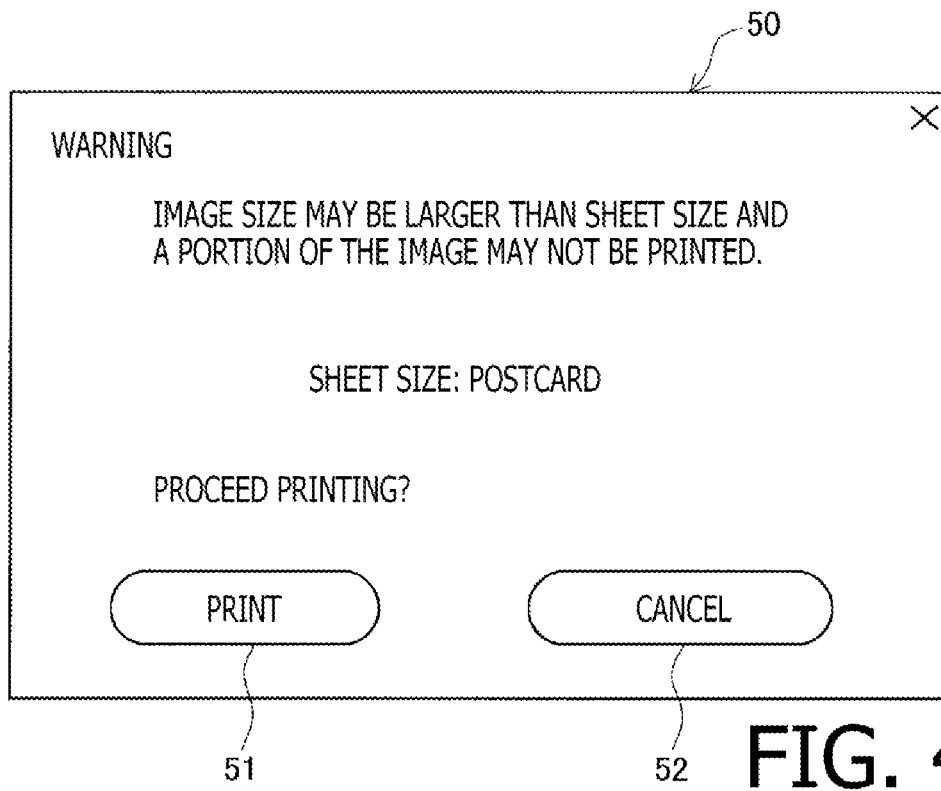
FIGS. 4A and 4B show examples of a warning message.
Figure 4B:
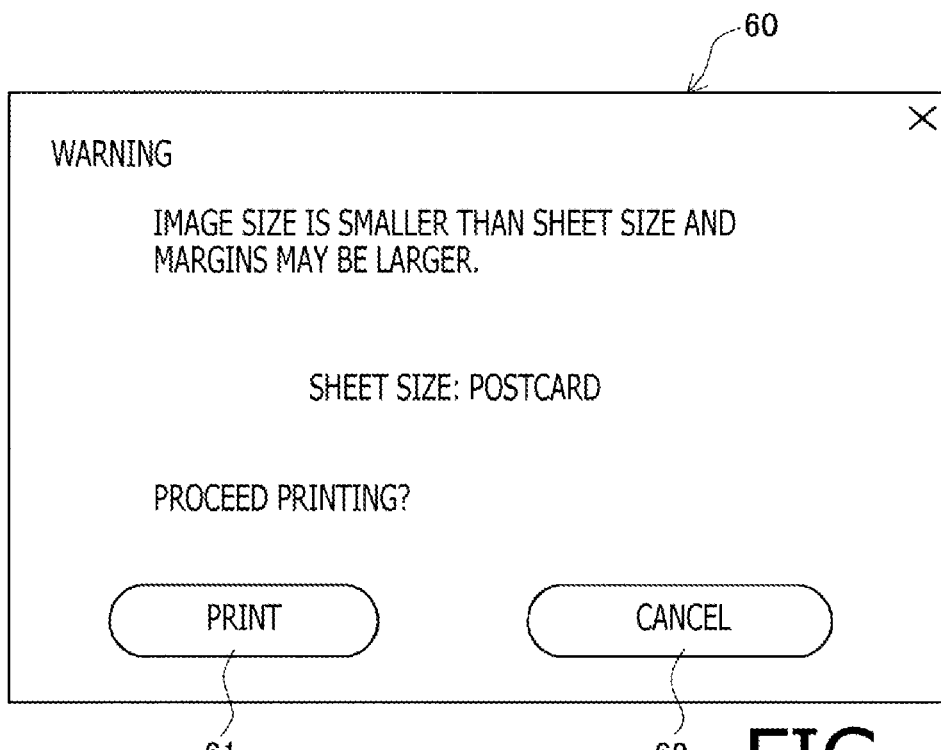

On the other hand, when the supporting program 42 determines "NG" in the size determining process in A08 (alt: [NG]), the supporting program 42 displays a warning message on the user IF 13 (A21). A21 is an example of a warning process. A warning is a message indicating, for example, that the size of the printed image is inappropriate for the sheet size in the print settings, as shown in FIGS. 4A and 4B. The supporting program 42 asks the user whether to continue printing as is or cancel printing by means of a warning message.

When the supporting program 42 determines in the size determining process that the image size of the image to be printed is larger than the sheet size in the print settings (YES in S106 of FIG. 3), the supporting program 42 displays, as shown in FIG. 4A, for example, a warning message 50 that indicates that the image may be larger than the sheet size and that a portion of the image may not be printed. This warning message 50 includes information about the sheet size of the print settings, a button 51 that receives an instruction to perform printing, and a button 52 that receives an instruction to cancel printing.

Figure 3:
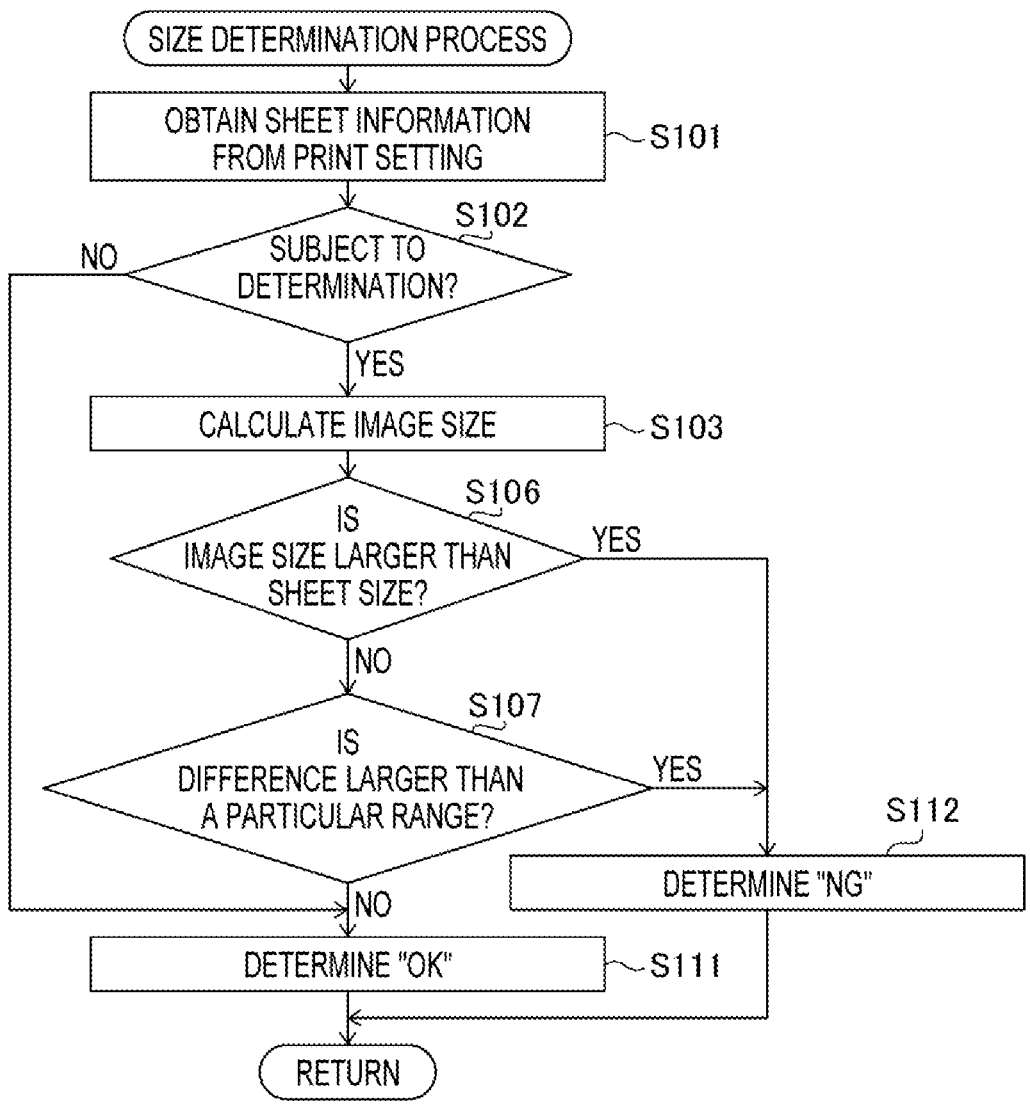
FIG. 3 is a flowchart illustrating a size mismatch determining process.

If the supporting program 42 determines in the size determining process that the image size of the image to be printed is smaller than the sheet size of the print settings, but the difference is outside the particular range (S107 of FIG. 3: YES), the supporting program 42 displays, as shown in FIG. 4B for example, a warning message 60 including a message indicating that the image size is smaller than the sheet size and the margins may be larger. For example, as shown in FIG. 4(B), a warning message 60 is displayed, including a message indicating that the printed image is smaller than the paper size and the margins may be relatively large. This warning message 60 includes information about the sheet size of the print settings, a button 61 used to receive an instruction to perform printing, and a button 62 used to receive a cancellation of the printing process.

It is noted that warnings are not necessarily limited to the display of the warning messages 50, 60, and the like, but may be an audible warning, or may be a combination of display and audio. Furthermore, the warning message may include information indicating the image size of the image to be printed or a preview image showing the image to be printed. Further, the content of the message to be displayed is not necessarily limited to warnings, but may also be a message to confirm the size of the image to be printed and/or the sheet size. Instead of displaying the warning messages 50 and 60, the supporting program 42 may pass the information and instructions for the warning to the general-use printing program 41 or the OS 21 and have the general-use printing program 41 or the OS 21 notify the user of the warning. The process of having the warning messages and/or the warning sounds output to the user IF 13 and the process of passing the warning information and instructions for reporting to the general-use printing program 41 are examples of a warning process.

The supporting program 42 receives input of a user operation to the button 51, 51, 61 or 62 (A22). When receiving an instruction to perform printing by an operation of the button 51 or 61 (alt: [print]), the supporting program 42 transmits the print data to the printer 2 (A23). A23 is the same process as A11. The printer 2 performs printing based on the received print data (A24).

On the other hand, when receiving the cancellation instruction by an operation of the button 52 or button 62 (alt: [cancel]), the supporting program 42 passes information to cancel the print job to the general-use printing program 41 (A25). The process in A25 is an example of a cancelling process according to aspects of the present disclosure. In this way, the general-use printing program 41 cancels the print job based on the print instruction received at A04 and terminates the printing process. The supporting program 42 may delete the print data generated at A07. By receiving the cancellation instruction in warning messages 50 and 60, the user's unintended printing can be reliably avoided.

The supporting program 42 may receive instructions to change the sheet size via the warning message 50 or 60 that is being displayed. Since the warning messages 50 and 60 in this embodiment report information about the currently set sheet size, the user can easily notice the mismatch with the size of the image be printed. When receiving an instruction to change the sheet size, the supporting program 42 may change the print settings received from the general-use printing program 41 at A06, and transmit the information on the changed print settings along with the print data to the printer 2. When the sheet size is changed based on the user's instructions and the print settings conform to the image size, appropriate printing can be expected.

As described above in detail, according to the present embodiment of the supporting program 42, when the PC 1 receives a print instruction to the general-use printing program 41, the supporting program 42 compares the size of the image represented by the print data to be printed with the sheet size included in the print settings to determine the suitability of the print data for printing. Further, when the PC 1 determines that the sheet size is inappropriate with respect to the image size, the PC 1 performs a process to warn the user about the sheet size before transmitting the print data. In this way, it can be expected that the user will make an input to avoid the printing, thereby increasing the likelihood that the user's unintended printing will be avoided.

The present embodiment disclosed herein is merely an example and does not limit aspects of the present disclosures in any way. Therefore, the technology disclosed herein can naturally be improved and modified in various ways within the scope of not departing from the gist thereof. For example, the device connected to the PC 1 is not necessarily limited to a printer, but any device having a printing function, such as an MFP (multifunction peripheral), a copier, a facsimile machine, and the like. Further, the number of printers connected to the PC 1 is not necessarily limited to the example (i.e., one) as shown in the drawings, but can be two or more.

All of the warning messages shown in the drawings are examples and are not restrictive. When the warning messages are displayed, buttons to receive instructions to print and cancel may be omitted. For example, the supporting program 42 may be configured to cancel printing after displaying a warning message if it is determined that the sheet size is inappropriate with respect to the image size. Alternatively, the supporting program 42 may transmit the print data to the printer 2 after displaying the warning message if the printer 2 has a function of cancelling printing the print data which the printer 2 has received. It should be noted, however, by accepting the user's instructions in response to the warning message, the user's intentions are more likely to be reflected than a case where the printing is uniformly canceled or print data is transmitted. Further, the warning message does not have to indicate the sheet size.

In the present embodiment, at S102 of the size determining process, whether or not the sheet size or the sheet type is subject to the determination is determined, but this determination may be omitted. That is, all print instructions may be subject to determination regardless of the sheet size or the sheet type.

In the present embodiment, even if the image size is smaller than the sheet size, when the difference is outside the particular range, a warning is made, but the warning may be omitted. Concretely, the determination in S107 of the size determining process may be omitted.

In the present embodiment, when the image size is smaller than the sheet size but the difference is outside the particular range, a warning is made. However, such a warning may be omitted. Concretely, the determination in S107 of the size determining process may be omitted. Further, the program that executes the process according to the present embodiment is not necessarily limited to the supporting program 42, but can be any program that is configured to receive instructions from the OS 21 or the general-use printing program 41 when printing using the general-use printing program 41.

The execution timing of the supporting program 42 is not necessarily limited to that of the above-described embodiment. For example, the supporting program 42 may receive the execution instruction directly from the OS 21, or the supporting program 42 may be a resident program. When the supporting program 42 is resident, the supporting program 42 performs the aforementioned operations upon receipt of an execution instruction.

In the flowchart and sequence chart disclosed in the embodiment, multiple processes in any number of steps can be arbitrarily changed in the order of execution or executed in parallel to the extent that there is no conflict in the processing content.

The processes disclosed in the embodiment may be executed by a single CPU, multiple CPUs, hardware such as an ASIC, or a combination thereof. Further, the processes disclosed in the embodiment may be realized in various forms, such as a recording medium containing a program for executing the process, or a method.

What is claimed is:

1. A non-transitory computer-readable recording medium for an information processing device which includes a memory and a computer, a printer being connected to the information processing device, the non-transitory computer-readable recording medium containing computer-executable instructions realizing a supporting program corresponding to the printer connected to the information processing device,
wherein, in response to a print instruction, which is output from an application program implemented in the information processing device, instructing the printer to print an image being made with respect to a general-use printing program implemented in an operating system of the information processing device, the instructions cause, when executed by the computer, the information processing device to:
obtain first size information indicating an image size of a raster image indicating an image subject to printing according to the print instruction, the image size including at least one of a vertical size or a horizontal size of the raster image, the vertical size being obtained based on a number of vertical dots and print resolution of the raster image, the horizontal size being obtained based on a number of horizontal dots and the print resolution of the raster image;

obtain second size information indicating a sheet size included in a print setting of the print instruction;

determine, by comparing the image size indicated by the first size information and the sheet size indicated by the second size information, whether the sheet size conforms to the image size; and warn using a user interface of the information processing device when determining that the sheet size does not conform to the image size.

2. The non-transitory computer-readable recording medium according to claim 1,
wherein, in response to the print instruction, the instructions further cause the information processing device to:
obtain, from the operating system, intermediate image data indicating the image subject to the printing according to the print instruction; and
obtain the first size information after the intermediate image data is obtained.

3. The non-transitory computer-readable recording medium according to claim 1,
wherein it is determined that that the sheet size does not conform to the image size when the image size indicated by the first size information is larger than the sheet size indicated by the second size information.

4. The non-transitory computer-readable recording medium according to claim 3,
wherein in a case where difference between the image size and the sheet size is larger than a particular range, it is determined that that the sheet size does not conform to the image size when the image size indicated by the first size information is equal to or smaller than the sheet size indicated by the second size information.

5. The non-transitory computer-readable recording medium according to claim 3,
wherein the instructions further cause the information processing device to:
receive a cancelling instruction to cancel a print job based on the print instruction through the user interface after warning, and cancelling the print job when receiving the cancelling instruction.

6. The non-transitory computer-readable recording medium according to claim 1,
wherein a size settable as the sheet size included in the print setting includes a particular size of high value,
wherein, in a case where the sheet size indicated by the second size information is the particular size, the instructions further cause the information processing device to warn before the raster image is transmitted to the printer when it is determined that the sheet size does not conform to the image size, and
wherein, in a case where the sheet size indicated by the second size information is not the particular size, the instructions further cause the information processing device not to warn.

7. The non-transitory computer-readable recording medium according to claim 1,
wherein a type settable as a sheet type included in the print setting includes a particular type of high value,
wherein, in a case where the sheet type included in the print setting is the particular type, the instructions further cause the information processing device to warn before the raster image is transmitted to the printer when it is determined that the sheet size does not conform to the image size, and
wherein, in a case where the sheet type included in the print setting is not the particular type, the instructions further cause the information processing device not to warn.

8. The non-transitory computer-readable recording medium according to claim 1,
wherein, the warning comprises a notification through the user interface of a sheet size indicated by the second size information.

9. A non-transitory computer-readable recording medium for an information processing device which includes a memory and a computer, a printer being connected to the information processing device, the non-transitory computer-readable recording medium containing computer-executable instructions realizing a supporting program corresponding to the printer connected to the information processing device,
wherein, in response to a print instruction, which is output from an application program implemented in the information processing device, instructing the printer to print an image being made with respect to a general-use printing program implemented in an operating system of the information processing device, the instructions cause, when executed by the computer, the information processing device to:
obtain first size information indicating an image size of a raster image indicating an image subject to printing according to the print instruction, the image size including at least one of a vertical size or a horizontal size of the raster image, the vertical size being obtained based on a number of vertical dots and print resolution of the raster image, the horizontal size being obtained based on a number of horizontal dots and the print resolution of the raster image;
obtain sheet information included in a print setting of the print instruction, the sheet information including second size information indicating a sheet size included in the print setting and sheet type information indicating a sheet type included in the print setting; and
determine whether the sheet information is subject to determination of conformance based on at least one of the second size information or the sheet type information, and
when determining that the sheet information is subject to determination of conformance:
determine, by comparing the image size indicated by the first size information and the sheet size indicated by the second size information, whether the sheet size conforms to the image size; and
warn using a user interface of the information processing device when determining that the sheet size does not confirm to the image size.

\* \* \* \* \*